United States Patent [19]
Akamatsu et al.

[11] Patent Number: 5,708,067
[45] Date of Patent: Jan. 13, 1998

[54] HEAT RESISTANT ORGANOPOLYSILOXANE COMPOSITION

[75] Inventors: Shoji Akamatsu; Haruhiko Furukawa; Toshinori Watanabe, all of Chiba Prefecture, Japan

[73] Assignee: Dow Corning Toray Silicone Co., Ltd., Tokyo, Japan

[21] Appl. No.: 778,425

[22] Filed: Dec. 26, 1996

[30] Foreign Application Priority Data

Dec. 28, 1995 [JP] Japan ................... 7-352805

[51] Int. Cl.$^6$ ................................................. C08K 5/24
[52] U.S. Cl. ............... 524/265; 524/266; 524/267; 524/268; 252/78.3; 528/18; 528/19
[58] Field of Search ............... 528/18, 19; 524/265, 524/267, 266, 268; 252/78.3

[56] References Cited

U.S. PATENT DOCUMENTS

Re. 28,938  8/1976  Koda et al. ............... 260/448.2 S
4,070,343  1/1978  Kishimoto et al. ............... 260/45.75 F
4,637,889  1/1987  Kishimoto et al. ............... 528/30
5,445,751  8/1995  Kanzaki et al. ............... 252/49.6

FOREIGN PATENT DOCUMENTS 96057  5/1984  Japan .

*Primary Examiner*—Melvyn I. Marquis
*Attorney, Agent, or Firm*—Alexander Weitz

[57] ABSTRACT

There is disclosed a heat resistant organopolysiloxane composition comprising:
(A) 100 parts by weight of an organopolysiloxane having a viscosity of 100 to 1,000,000 centistokes at 25° C.;
(B) 0.001 to 10 parts by weight of a reaction product of an alkali metal silanolate compound with cerium chloride or a cerium carboxylate; and
(C) a diorganopolysiloxane having silicon-bonded hydrogen groups only at its molecular chain terminals, component (C) being present in a quantity sufficient to provide 1 to 10,000 parts per million of silicon-bonded hydrogen based on the total weight of said composition.

14 Claims, No Drawings

HEAT RESISTANT ORGANOPOLYSILOXANE COMPOSITION

FIELD OF THE INVENTION

The present invention relates to a highly heat-resistant organopolysiloxane composition.

DESCRIPTION OF THE INVENTION

The following, for example, have been proposed as highly heat-resistant organopolysiloxane compositions.

Japanese Patent Publication (Kokoku) Number Sho 53-980 (980/1978) teaches an organopolysiloxane composition comprising organopolysiloxane and the reaction product of an alkali metal silanolate compound with cerium chloride;

Japanese Patent Publication (Kokoku) Number Sho 51-24377 (24,377/1976) teaches an organopolysiloxane composition comprising organopolysiloxane and the reaction product of cerium carboxylate with an alkali metal silanolate compound.

Japanese Patent Application Laid Open (Kokai or Unexamined) Number Sho 51-66344 (66,344/1976) teaches an organopolysiloxane composition comprising organopolysiloxane, the reaction product of an alkali metal silanolate compound with cerium chloride or cerium carboxylate, and at least 1 selection from the carboxylates and alkoxy compounds of zirconium, titanium, and iron.

Japanese Patent Publication (Kokoku) Number Hei 5-61308 (61,308/1993) teaches an organopolysiloxane composition comprising organopolysiloxane, the reaction product of an alkali metal silanolate compound with cerium chloride, organohydrogenpolysiloxane having at least 1 silicon-bonded hydrogen in each molecule, and an alkoxy-containing titanium compound.

However, the organopolysiloxane compositions proposed in Japanese Patent Publication Numbers Sho 53-980 and Sho 51-24377 and Japanese Patent Application Laid Open Number Sho 51-66344 do not exhibit a satisfactory heat resistance. In the case of the organopolysiloxane composition proposed in Japanese Patent Publication Number Hei 5-61308, the organohydrogenpolysiloxane contains its silicon-bonded hydrogen substantially in pendant position on the molecular chain and is less heat resistant than the base organopolysiloxane. Due to the consequent formation of three-dimensional structures as a result of thermal degradation, this composition suffers from such problems as a deterioration in heat resistance and a corresponding increase in viscosity. Furthermore, while the organopolysiloxane composition taught by this reference does not suffer from problems with its heat resistance when the base organopolysiloxane has a viscosity of 100 centistokes or less, this composition has a deficient heat resistance at higher viscosities for the base organopolysiloxane.

SUMMARY OF THE INVENTION

The object of the present invention is to provide a highly heat-resistant organopolysiloxane composition comprising (A) 100 weight parts of an organopolysiloxane with a viscosity at 25° C. of 100 to 1,000,000 centistokes;

(B) 0.001 to 10 weight parts of a reaction product of an alkali metal silanolate compound with cerium chloride or cerium carboxylate; and (C) a diorganopolysiloxane bearing silicon-bonded hydrogen only at its molecular chain terminals, in a quantity such that this component provides 1 to 10,000 weight-ppm of silicon-bonded hydrogen (referred to the subject composition). The present invention has been disclosed in Japanese Patent Application No. Hei 7-352805, the latter being hereby incorporated by reference.

DETAILED DESCRIPTION OF THE INVENTION

Component (A), which is the base ingredient in the instant composition, is an organopolysiloxane having a viscosity at 25° C. of 100 to 1,000,000 centistokes. The silicon-bonded groups in component (A) are exemplified by alkyl groups such as methyl, ethyl, propyl, and butyl; alkenyl groups such as vinyl, allyl, butenyl, pentenyl, and hexenyl; aryl groups such as phenyl, tolyl, and xylyl; aralkyl groups such as benzyl, and phenethyl; and haloalkyl groups such as 3,3,3-trifluoropropyl. Among these examples, methyl, vinyl, phenyl, and 3,3,3-trifluoropropyl are preferred. Insofar as the heat resistance of the instant composition is not impaired, small amounts of hydroxyl and/or alkoxy (e.g., methoxy, ethoxy) may be bonded to the silicon in component (A). The molecular structure of component (A) is exemplified by straight-chain, partially branched straight-chain, branch-chain, and cyclic structures, with straight-chain and partially branched straight-chain structures being preferred. The molecular chain endblocking groups for component (A) with a straight-chain or partially branched straight-chain structure are exemplified by triorganosiloxy groups such as trimethylsiloxy, dimethylvinylsiloxy, dimethylphenylsiloxy, inter alia, and by diorganohydroxysiloxy groups such as dimethylhydroxysiloxy, methylvinylhydroxysiloxy, methylphenylhydroxysiloxy, and the like. Triorganosiloxy groups are preferred for the better heat resistance they confer.

Component (A) should have a viscosity at 25° C. of 100 to 1,000,000 centistokes, preferably 500 to 1,000,000 centistokes, and more preferably 1,000 to 1,000,000 centistokes. Organopolysiloxane compositions prepared from a component (A) with a viscosity at 25° C. below 100 centistokes do not suffer from problems with heat resistance, even when component (C) is omitted and an organohydrogenpolysiloxane having pendant SiH as in the organopolysiloxane composition as proposed in Japanese Patent Publication Hei 5-61308, is employed. When, on the other hand, this viscosity exceeds 1,000,000 centistokes, the resulting organopolysiloxane composition will suffer from a reduced fluidity and hence an impaired processability.

The organopolysiloxane (A) is exemplified by the following:

trimethylsiloxy-endblocked dimethylpolysiloxanes,
trimethylsiloxy-endblocked dimethylsiloxane-methylphenylsiloxane copolymers,
trimethylsiloxy-endblocked dimethylsiloxane-diphenylsiloxane copolymers,
trimethylsiloxy-endblocked methylvinylpolysiloxanes,
trimethylsiloxy-endblocked dimethylsiloxane-methylvinylsiloxane copolymers,
trimethylsiloxy-endblocked methylphenylpolysiloxanes,
trimethylsiloxy-endblocked dimethylsiloxane-methyl(3,3,3-trifluoropropyl)siloxane copolymers,
dimethylvinylsiloxy-endblocked dimethylpolysiloxanes,
dimethylallylsiloxy-endblocked dimethylpolysiloxanes,
methylphenylvinylsiloxy endblocked methylphenylsiloxane-dimethylsiloxane copolymers,
dimethylhydroxysiloxy-endblocked dimethylpolysiloxanes,
dimethylhydroxysiloxy-endblocked dimethylsiloxane-methylphenylsiloxane copolymers, dimethylhydroxysiloxy-endblocked dimethylsiloxane-methylvinylsiloxane copolymers, dimethylmethoxysiloxy-endblocked dimethylpolysiloxanes, and organosiloxane copolymers composed of $(CH_3)_3SiO_{1/2}$ and $SiO_{4/2}$ siloxane units.

The trimethylsiloxy-endblocked dimethylpolysiloxanes are specifically preferred.

Component (B), like component (C), provides the instant composition with heat resistance. Component (B) is the reaction product of an alkali metal silanolate compound with cerium chloride or cerium carboxylate. This component is already known from Japanese Patent Publication (Kokoku) Number Sho 53-980, Japanese Patent Publication (Kokoku) Number Sho 51-24377, Japanese Patent Application Laid Open (Kokai or Unexamined) Number Sho 51-66344, and Japanese Patent Publication (Kokoku) Number Hei 5-61308. Component (B) can be prepared, for example, by reacting cerium chloride or cerium carboxylate with an alkali metal silanolate compound a/t room temperature or elevated temperature, optionally in the presence of an organic solvent, (e.g., an alcohol such as methanol, ethanol, isopropanol, or butanol; aromatic hydrocarbon such as toluene or xylene; aliphatic hydrocarbon such as hexane or heptane; or mineral spirits, ligroin, petroleum ether, inter alia.) The organic solvent, when present, and low boilers are preferably distilled from the resulting reaction product and any precipitate is preferably filtered off. Dialkylformamide or hexaalkylphosphoramide can be added to accelerate the reaction. Component (B) preferably has a cerium content of 0.1 to 5 weight %.

Anhydrous cerium chloride is preferably used as the cerium chloride in the preparation of component (B). The cerium carboxylate is preferably the cerium salt of a carboxylic acid, for example, cerium 2-ethylhexanoate, cerium naphthenate, cerium oleate, cerium laurate, and cerium stearate. The alkali metal silanolate compound is exemplified by potassium and sodium silanolate compounds, wherein alkali metal silanolate compounds having at least 3 organosiloxane units are preferred. The subject alkali metal silanolate compounds can be prepared, for example, by the ring-opening reaction of cyclic organosiloxane with alkali metal hydroxide or by the reaction of silanol-endblocked diorganosiloxane with alkali metal hydroxide. The Si-bonded organic groups in the alkali metal silanolate compounds are exemplified by alkyl groups such as methyl, ethyl, propyl and butyl; alkenyl groups such as vinyl, allyl, butenyl, pentenyl, hexenyl; aryl groups such as phenyl, tolyl, and xylyl; aralkyl groups such as benzyl, and phenethyl; and haloalkyl groups such as 3,3,3-trifluoropropyl. Methyl, vinyl, phenyl, and 3,3,3-trifluoropropyl are preferred in practical application.

Component (B) should be added at a level 0.001 to 10 weight parts per 100 weight parts of component (A). A satisfactory heat resistance cannot be imparted to the organopolysiloxane composition when component (B) is added at less than about 0.001 weight part per 100 weight parts component (A). On the other hand, addition of more than 10 weight parts component (B) provides little improvement in the heat resistance while on the other hand causing problems such as a reduction in transparency and/or a loss of uniformity in the composition.

Component (C), also provides the instant composition with heat resistance and is a diorganopolysiloxane bearing silicon-bonded hydrogen only at its molecular chain terminals. The silicon-bonded organic groups in component (C) are exemplified by the same organic groups described above in connection with the alkali metal silanolate, including preferred embodiments thereof. Component (C) should have a substantially straight-chain molecular structure, although a portion of the molecular chain may be branched. In order to facilitate mixing into component (A), component (C) preferably has a viscosity at 25° C. of from 1 to 10,000 centistokes.

Diorganopolysiloxane (C) is exemplified by dimethylhydrogensiloxy-endblocked dimethylpolysiloxanes, dimethylhydrogensiloxy-endblocked dimethylsiloxanemethylvinylsiloxane copolymers, and dimethylhydrogensiloxy-endblocked dimethylsiloxane-methylphenylsiloxane copolymers. Dimethylhydrogensiloxy-endblocked dimethylpolysiloxanes are preferred.

Component (C) is added at a level to provide 1 to 10,000 weight parts per million (ppm based on the total composition) silicon-bonded hydrogen from component (C). A satisfactory heat resistance cannot be imparted to the composition when component (C) provides less than 1 weight-ppm or more than 10,000 ppm silicon-bonded hydrogen, in each case referred to the organopolysiloxane composition.

The instant composition may contain other components on an optional basis, for example, tetraalkyl titanates such as tetrabutyl titanate; metal salts of carboxylic acids such as zirconium naphthenate and iron naphthenate; isopropylalkoxy compounds of zirconium; inorganic fillers such as fumed silica, precipitated silica, diatomaceous earth, and quartz powder; metal soaps; and pigments.

By virtue of its excellent heat resistance, the instant composition is well suited for application as a thermal medium oil, as an oil for high-temperature transformers, and as an oil for rubber impregnation, dampers, and fan clutches. Moreover, the combination of this composition as a base oil with a thickener such as a metal soap or with an inorganic filler such as silica affords a highly heat-resistant grease or compound.

EXAMPLES

The organopolysiloxane composition according to the present invention is explained below in greater detail through working examples. The values reported for the viscosity were measured at 25° C.

Reference Example 1

Trimethylsiloxy-endblocked dimethylpolysiloxane (120 g) with a viscosity of 20 centistokes and 0.5 g of hexamethylphosphoramide were added to 60 g of a potassium silanolate obtained by the ring-opening reaction of a mixture of hexamethylcyclotrisiloxane and octamethylcyclotetrasiloxane with potassium hydroxide. A reaction was run at 115° C. under a nitrogen purge for 2 hours to yield a potassium silanolate product. This potassium silanolate product (100 g) was then dissolved in 150 g of isopropanol and a reaction was subsequently run by the dropwise addition to this of a mixture of 2.5 g of anhydrous cerium chloride, 50 g of ethanol, and 50 g of methanol, while stirring. The reaction mixture was filtered and the filtrate was heated at 40° to 50° C. under reduced pressure in order to remove the ethanol and methanol. An additional filtration then yielded a liquid, light yellow reaction product. The cerium concentration in this reaction product was 0.8 weight %.

Example 1

The following were poured into a 100-mL glass beaker and mixed to homogeneity to yield a transparent dimethylpolysiloxane composition: 20 g of trimethylsiloxy-endblocked dimethylpolysiloxane with a viscosity of 1,000 centistokes, 0.09 g of the reaction product whose preparation is described in Reference Example 1, and 0.04 g of dimethylhydrogensiloxy-endblocked dimethylpolysiloxane with a viscosity of 10 centistokes and a silicon-bonded hydrogen content of 0.16 weight %.

The glass beaker containing the dimethylpolysiloxane composition was then held in a forced circulation oven at 280° C. The time until gelation of the composition was measured and is reported in Table 1.

Example 2

The following were poured into a 100-mL glass beaker and mixed to homogeneity to yield a transparent dimethylpolysiloxane composition: 20 g of trimethylsiloxy-endblocked dimethylpolysiloxane with a viscosity of 1,000 centistokes, 0.09 g of the reaction product whose preparation is described in Reference Example 1, and 0.08 g of dimethylhydrogensiloxy-endblocked dimethylpolysiloxane with a viscosity of 25 centistokes and a silicon-bonded hydrogen content of 0.10 weight %.

The glass beaker containing the dimethylpolysiloxane composition was then held in a forced circulation oven at 280° C. The time until gelation of the composition was measured and is reported in Table 1.

Example 3

The following were poured into a 100-mL glass beaker and mixed to homogeneity to yield a transparent dimethylpolysiloxane composition: 20 g of trimethylsiloxy-endblocked dimethylpolysiloxane with a viscosity of 10,000 centistokes, 0.09 g of the reaction product whose preparation is described in Reference Example 1, and 0.04 g of dimethylhydrogensiloxy-endblocked dimethylpolysiloxane with a viscosity of 10 centistokes and a silicon-bonded hydrogen content of 0.16 weight %.

The glass beaker containing the dimethylpolysiloxane composition was then held in a forced circulation oven at 280° C. The time until gelation of the composition was measured and is reported in Table 1.

Comparative Example 1

The following were poured into a 100-mL glass beaker and mixed to homogeneity to yield a turbid white dimethylpolysiloxane composition: 20 g of trimethylsiloxy-endblocked dimethylpolysiloxane with a viscosity of 1,000 centistokes and 0.09 g of the reaction product whose preparation is described in Reference Example 1.

The glass beaker containing the dimethylpolysiloxane composition was then held in a forced circulation oven at 280° C. The time until gelation of the composition was measured and is reported in Table 1.

Comparative Example 2

The following were poured into a 100-mL glass beaker and mixed to homogeneity to yield a dimethylpolysiloxane composition exhibiting a faint white turbidity: 20 g of trimethylsiloxy-endblocked dimethylpolysiloxane with a viscosity of 1,000 centistokes, 0.09 g of the reaction product whose preparation is described in Reference Example 1, and 0.01 g of trimethylsiloxy-endblocked methylhydrogenpolysiloxane with a viscosity of 20 centistokes and a silicon-bonded hydrogen content of 1.56 weight %.

The glass beaker containing the dimethylpolysiloxane composition was then held in a forced circulation oven at 280° C. The time until gelation of the composition was measured and is reported in Table 1.

Comparative Example 3

Twenty grams of trimethylsiloxy-endblocked dimethylpolysiloxane with a viscosity of 1,000 centistokes was poured into a 100-mL glass beaker.

The glass beaker containing the dimethylpolysiloxane was then held in a forced circulation oven at 280° C., and the time until gelation was measured. The result is reported in Table 1.

TABLE 1

| | classification | | | | | |
|---|---|---|---|---|---|---|
| | present invention | | | comparative examples | | |
| | Example 1 | Example 2 | Example 3 | Comp. Ex. 1 | Comp. Ex. 2 | Comp. Ex. 3 |
| gelation time of the dimethylpolysiloxane compositions (hours) | >500 | >500 | >500 | <100 | <200 | <10 |

That which is claimed is:

1. A composition comprising:
   (A) 100 parts by weight of an organopolysiloxane having a-viscosity of 100 to 1,000,000 centistokes at 25° C.;
   (B) 0.001 to 10 parts by weight of a reaction product of
      (i) an alkali metal silanolate compound with
      (ii) a compound selected from the group consisting of cerium chloride and cerium carboxylate; and
   (C) a diorganopolysiloxane having silicon-bonded hydrogen groups only at its molecular chain terminals,
   said diorganopolysiloxane (C) being present in a quantity sufficient to provide 1 to 10,000 parts per million of silicon-bonded hydrogen based on the total weight of said composition.

2. The composition according to claim 1, wherein component (C) is a dimethylhydrogensiloxy-endblocked dimethylpolysiloxane.

3. The composition according to claim 1, wherein component (A) has a viscosity of 500 to 1,000,000 centistokes at 25° C.

4. The composition according to claim 3, wherein component (C) is a dimethylhydrogensiloxy-endblocked dimethylpolysiloxane.

5. The composition according to claim 1, wherein component (A) is dimethylpolysiloxane.

6. The composition according to claim 1, wherein component (A) is selected from the group consisting of trimethylsiloxy-endblocked dimethylpolysiloxanes,
   trimethylsiloxy-endblocked dimethylsiloxane-methylphenylsiloxane copolymers,
   trimethylsiloxy-endblocked dimethylsiloxane-diphenylsiloxane copolymers,
   trimethylsiloxy-endblocked methylvinylpolysiloxanes,
   trimethylsiloxy-endblocked dimethylsiloxane-methylvinylsiloxane copolymers,
   trimethylsiloxy-endblocked methylphenylpolysiloxanes,
   trimethylsiloxy-endblocked dimethylsiloxane-methyl(3,3,3-trifluoropropyl)siloxane copolymers,
   dimethylvinylsiloxy-endblocked dimethylpolysiloxanes, dimethylallylsiloxy-endblocked dimethylpolysiloxanes, methylphenylvinylsiloxy-endblocked methylphenylsiloxane-dimethylsiloxane copolymers, dimethylhydroxysiloxy-endblocked dimethylpolysiloxanes, dimethylhydroxysiloxy-endblocked dimethylsiloxane-methylphenylsiloxane copolymers, dimethylhydroxysiloxy-endblocked dimethylsiloxane-methylvinylsiloxane copolymers, dimethylmethoxysiloxy-endblocked dimethylpolysiloxanes, and organosiloxane copolymers composed of $(CH_3)_3SiO_{1/2}$ and $SiO_{4/2}$ siloxane units.

7. The composition according to claim 6, wherein component (A) is a trimethylsiloxy-endblocked dimethylpolysiloxane.

8. The composition according to claim 1, wherein component (C) is selected from the group consisting of dimethylhydrogensiloxy-endblocked dimethylpolysiloxanes, dimethylhydrogensiloxy-endblocked dimethylsiloxane-methylvinylsiloxane copolymers, and dimethylhydrogensiloxy-endblocked dimethylsiloxanemethylphenyl-siloxane copolymers.

9. The composition according to claim 7, wherein component (C) is a dimethylhydrogensiloxy-endblocked dimethylpolysiloxane.

10. The composition according to claim 1, wherein said alkali metal silanolate compound (i) is selected from the group consisting of potassium silanolate and sodium silanolate and said cerium carboxylate is selected from the group consisting of cerium 2-ethylhexanoate, cerium naphthenate, cerium oleate, cerium laurate and cerium stearate.

11. The composition according to claim 2, wherein said alkali metal silanolate compound (i) is selected from the group consisting of potassium silanolate and sodium silanolate and said cerium carboxylate is selected from the group consisting of cerium 2-ethylhexanoate, cerium naphthenate, cerium oleate, cerium laurate and cerium stearate.

12. The composition according to claim 3, wherein said alkali metal silanolate compound (i) is selected from the group consisting of potassium silanolate and sodium silanolate and said cerium carboxylate is selected from the group consisting of cerium 2-ethylhexanoate, cerium naphthenate, cerium oleate, cerium laurate and cerium stearate.

13. The composition according to claim 4, wherein said alkali metal silanolate compound (i) is selected from the group consisting of potassium silanolate and sodium silanolate and said cerium carboxylate is selected from the group consisting of cerium 2-ethylhexanoate, cerium naphthenate, cerium oleate, cerium laurate and cerium stearate.

14. The composition according to claim 5, wherein said alkali metal silanolate compound (i) is selected from the group consisting of potassium silanolate and sodium silanolate and said cerium carboxylate is selected from the group consisting of cerium 2-ethylhexanoate, cerium naphthenate, cerium oleate, cerium laurate and cerium stearate.

* * * * *